United States Patent
Decook et al.

(10) Patent No.: US 9,811,984 B2
(45) Date of Patent: Nov. 7, 2017

(54) SENSING MODULE FOR MONITORING CONDITIONS OF A PUMP OR PUMP ASSEMBLY

(71) Applicant: ITT MANUFACTURING ENTERPRISES LLC., Wilmington, DE (US)

(72) Inventors: Bradley C. Decook, Victor, NY (US); Daniel J. Kernan, Liverpool, NY (US); Jeffrey Sullivan, Syracuse, NY (US); Neil Loychik, Victor, NY (US); Naveen George, Rochester, NY (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 0 days.

(21) Appl. No.: 14/685,134

(22) Filed: Apr. 13, 2015

(65) Prior Publication Data

US 2016/0300459 A1    Oct. 13, 2016

(51) Int. Cl.
*G08B 5/22*      (2006.01)
*G09F 9/33*      (2006.01)
(Continued)

(52) U.S. Cl.
CPC .................. *G08B 5/36* (2013.01); *F21V 5/04* (2013.01); *F21V 7/0091* (2013.01); *G01H 1/00* (2013.01);
(Continued)

(58) Field of Classification Search
CPC ......... G01H 1/003; G07C 3/00; G01M 7/025; G01R 31/343; F21V 5/04; F21V 7/0091; G08B 5/36
(Continued)

(56) References Cited

U.S. PATENT DOCUMENTS 4,164,149 A    8/1979   Okubo
4,245,370 A    1/1981   Baker
(Continued)

FOREIGN PATENT DOCUMENTS

CN    1081323 C      3/2002
WO    2009117755    10/2009
(Continued)

OTHER PUBLICATIONS

Page 1 of Office Action issued in China on Jul. 12, 2011 in counterpart CN application No. 200880115571.2 (1 page).
English language abstract of CN1081323 (1 page).

*Primary Examiner* — John A Tweel, Jr.
(74) *Attorney, Agent, or Firm* — Ware, Fressola, Maguire & Barber LLP (57) ABSTRACT

A sensing module for configuring on a vibrating machine or structure, such as a pump or pump assembly is provided. The sensing module includes an outer shell configured with a recessed portion, and encapsulated electronics having a multicolored light array arranged inside the outer shell. The multicolored light array responds to signaling containing information about a condition being sensed or monitored by the sensing module and provides along a projection axis at least one beam of light containing information about the condition. The signaling is received from one or more of the other encapsulated electronics, including an accelerometer or temperature sensing device. The sensing module includes a domed lens configured in the recessed portion of the outer shell, and configured to project the at least one beam of light along the projection axis with a visibility of 360° for viewing from afar, by an observer visually monitoring the sensing module.

16 Claims, 9 Drawing Sheets

(51) Int. Cl.
*G08B 5/36* (2006.01)
*G01H 1/00* (2006.01)
*G01J 1/42* (2006.01)
*G07C 3/00* (2006.01)
*F21V 5/04* (2006.01)
*F21V 7/00* (2006.01)
*G01M 13/04* (2006.01)

(52) U.S. Cl.
CPC ............ *G01H 1/003* (2013.01); *G01J 1/4204* (2013.01); *G01M 13/045* (2013.01); *G07C 3/00* (2013.01)

(58) Field of Classification Search
USPC ..... 340/815.45, 679, 683, 635, 648; 73/660; 361/23; 362/255
See application file for complete search history.

(56) References Cited

U.S. PATENT DOCUMENTS

| | | |
|---|---|---|
| 4,367,506 A | 1/1983 | Lapsker |
| 4,399,513 A | 8/1983 | Sullivan et al. |
| 4,467,260 A | 8/1984 | Mallick, Jr. et al. |
| 4,506,218 A | 3/1985 | Brown et al. |
| 5,189,350 A | 2/1993 | Mallett |
| 5,237,310 A | 8/1993 | Smith |
| 5,591,916 A | 1/1997 | Byrne |
| 5,847,658 A | 12/1998 | Irie et al. |
| 5,852,351 A | 12/1998 | Canada et al. |
| 6,257,066 B1 | 7/2001 | Chandler et al. |
| 6,412,131 B1 | 7/2002 | Zhao et al. |
| 6,547,423 B2 * | 4/2003 | Marshall ................... F21V 5/04 362/255 |
| 6,672,168 B2 | 1/2004 | Higgins |
| 8,154,417 B2 | 4/2012 | Hauenstein et al. |
| 2002/0140566 A1 | 10/2002 | Holroyd |
| 2003/0043046 A1 | 3/2003 | Watwood et al. |
| 2003/0112146 A1 | 6/2003 | Sobel et al. |
| 2003/0159515 A1 | 8/2003 | Tonomura |
| 2005/0231350 A1 | 10/2005 | Litterll et al. |
| 2005/0284226 A1 | 12/2005 | Boda et al. |
| 2006/0265106 A1 | 11/2006 | Giles et al. |
| 2009/0093975 A1 | 4/2009 | Judd |
| 2010/0002435 A1 | 1/2010 | Rash |
| 2013/0292709 A1 | 11/2013 | Tong et al. |

FOREIGN PATENT DOCUMENTS

| | | |
|---|---|---|
| WO | 2013096254 | 6/2013 |
| WO | 2013175162 | 11/2013 |

* cited by examiner

Figure 2: Outer Shell

Figure 3: Lens and Shell Window

Figure 4: Lens Illumination

SENSING MODULE FOR MONITORING CONDITIONS OF A PUMP OR PUMP ASSEMBLY

BACKGROUND OF THE INVENTION

1. Field of the Invention

This application relates to a technique for monitoring a vibrating machine or structure, such as a pump or pump assembly.

2. Brief Description of Related Art

Techniques for monitoring a vibrating machine or structure are known in the art. By way of example, a handheld vibration analyzer is known in the art, e.g., that requires a person to use and perform an interpretation based on readings provided from the handheld vibration analyzer. Alternatively, a monitoring system is also known in the art, e.g., that is a very expensive permanent installation. Both techniques are susceptible to inconsistent measurements due to different data collection and handling. In addition, the processing of a large data set is not feasible across the industry and available sources using current known techniques.

See also U.S. Pat. No. 8,154,417, which discloses a compact self-contained condition monitoring device, is assigned to the assignee of the present application, and is incorporated hereby by reference. In operation, the compact self-contained condition monitoring device is coupled to a vibrating machine, senses vibration along multiple axes in relation the vibrating machine, as well as the temperature thereof, processing signaling containing information about the same, and monitors the condition of the vibrating machine based upon said signaling processed.

SUMMARY OF THE INVENTION

The present invention provides new and unique apparatus for monitoring a vibrating machine or structure, such as a pump or pump assembly.

By way of example, the apparatus may take form of a sensing module for configuring on the vibrating machine or structure, such as the pump or pump assembly.

The sensing module may include an outer shell configured with a recessed portion, and a base having encapsulated electronics.

The encapsulated electronics may include a multicolored light array that is arranged inside the outer shell, and also may be configured to respond to signaling containing information about a condition being sensed or monitored by the sensing module and to provide along a projection axis at least one beam of light containing information about the condition. By way of example, the signaling may be received from one or more of the other encapsulated electronics, such as an accelerometer or temperature sensing device.

The sensing module may also include a domed lens configured in the recessed portion of the outer shell, and also configured to reflect, re-reflect and project the at least one beam of light outwardly in relation to the projection axis with a visibility of 360° for viewing from afar, e.g., by an observer visually monitoring the sensing module.

The sensing module may also include one or more of the following features:

The domed lens may be configured with a middle lens portion having a top curved surface and two side lens portions, e.g., each having a side angled flat or curved surface, that are transparent to project the at least one beam of light.

The domed lens may be configured with a lower collimator lens portion configured to receive the at least one beam of light and provide at least one beam of collimated light to the middle lens portion and the two side lens portions of the domed lens.

The lower collimator lens portion may include outwardly angled surfaces, so that the at least one beam of light projected from the multicolored light array can fan outwardly into the domed lens in the form of rays that spread out or diverge away at least partly from the projection axis A as the at least one beam of light passes through lower collimator lens portion.

The middle lens portion, the two side lens portions and the lower collimator lens portion may be configured as a molded integral unit. The molded integral unit may be made of a clear plastic, including a polyamide 12 material used for injection molding, although embodiments are envisioned using other types or kinds of material either now known or later developed in the future.

The recessed portion may be configured or formed as a recessed open portion to receive the lower collimator lens portion when the domed lens and the outer shell are coupled together.

The domed lens may be configured to provide a lens illumination having multiple beams of light with rays of light reflecting and re-reflecting off the top curved surface and the bottom surface before passing through the domed lens so as to provide the visibility of 360°, e.g., for viewing from afar, e.g., by an observer visually monitoring the sensing module.

The multicolored light array may include a multicolored LED array, e.g., having
- a green LED that indicates that the device being monitored is in good condition;
- a red LED that indicates that the device being monitored is in an alarm condition; and
- a blue LED that indicates that the sensing module is paired with another device.

The encapsulated electronics may include sensors configured to respond to the condition being sensed and monitored by the sensing module and provide the signaling to be received by the multicolored light array, e.g., which responds by providing the suitable beam of LED light.

The sensors may be configured to respond temperature and vibration stimuli and provide the signaling containing information about temperature and vibration data sensed, e.g., including where the sensors are accelerometers or temperature sensors.

The sensing module may include a sensing LED and an activation sticker configured to engage a top surface of the outer shell and cover the sensing LED; the sensing LED may be configured to respond to presence or absence of ambient light and provide a sensing LED signal containing information to turn the sensing module ON or OFF depending on the ambient light sensed; and the activation sticker may be configured to be peeled off the top surface of the outer shell so as to allow the sensing LED to sense the presence of light.

The sensing module may include a light sensing LED module configured to receive suitable signaling to change the light level sensitivity of the light sensing LED.

The suitable signaling may be provided by a mobile application or app.

BRIEF DESCRIPTION OF THE DRAWING

The drawing includes the following Figures, which are not necessarily drawing to scale:

FIG. 2C1 is a cross-sectional view along section lines AA-AA of the outer shell shown in FIG. 2C, according to some embodiments of the present invention.

FIG. 2C2 is a cross-sectional view along section lines B-B of the outer shell shown in FIG. 2C, according to some embodiments of the present invention.

FIG. 5 includes FIGS. 5A and 5B, where

DETAILED DESCRIPTION OF THE INVENTION

Figure 1:
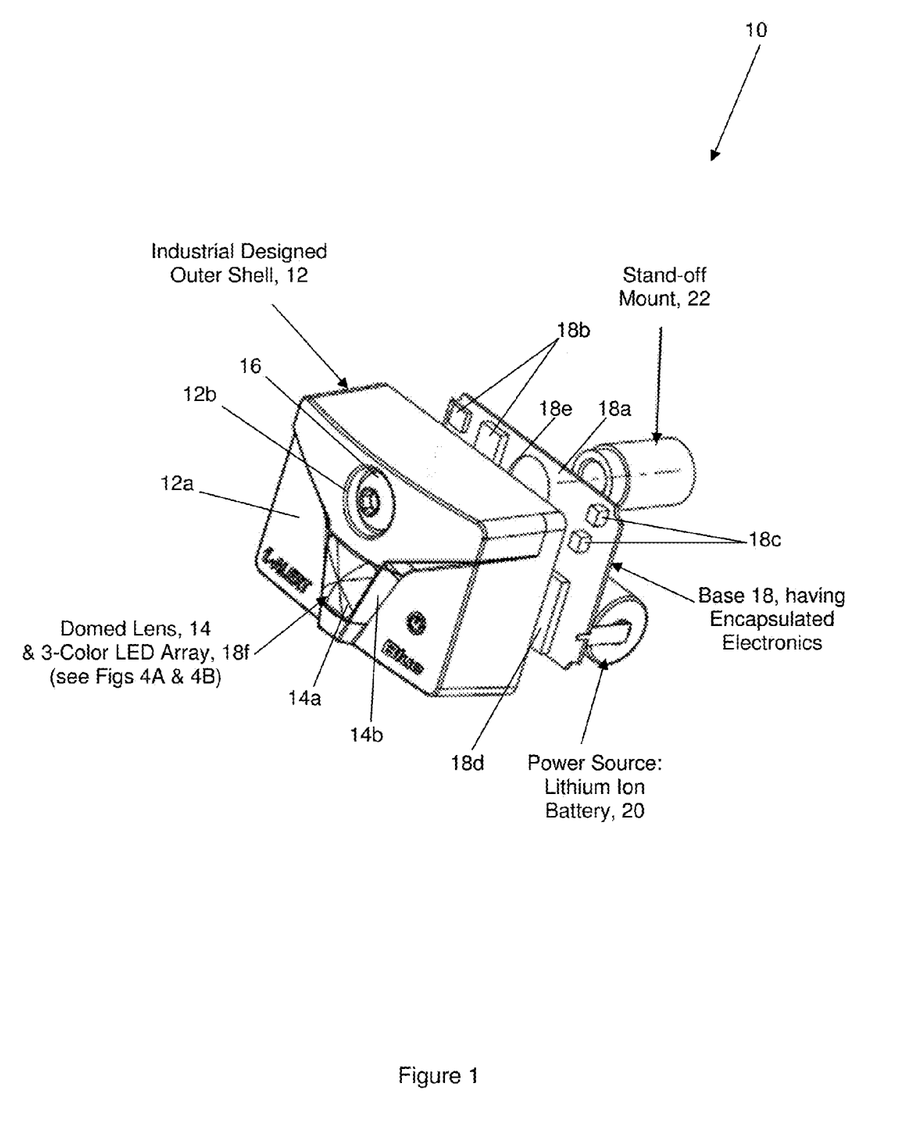
FIG. 1 is an exploded view of a sensing module, according to some embodiments of the present invention.
Figure 2A:
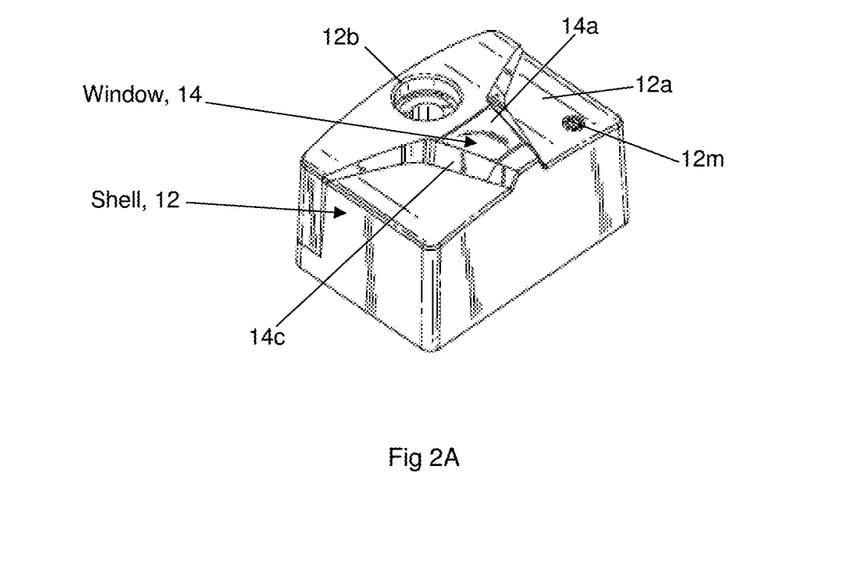
FIG. 2A is a top perspective view of an outer shell of a sensing module, according to some embodiments of the present invention.
Figure 2B:
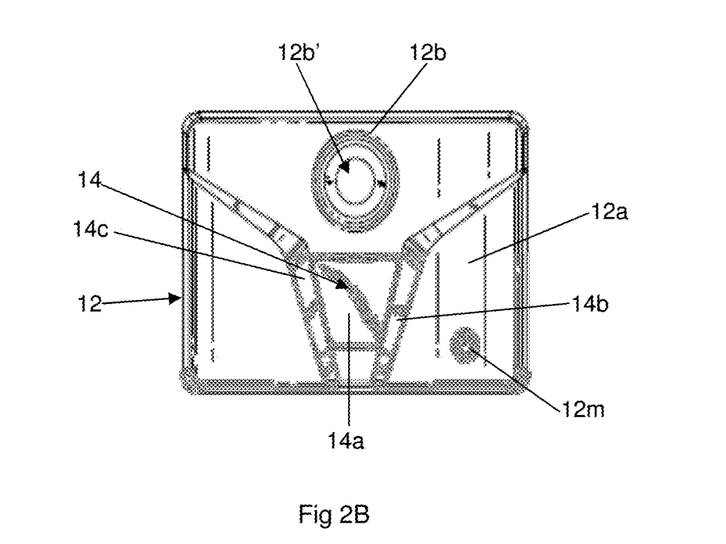
FIG. 2B is a bottom perspective view of an outer shell of a sensing module, according to some embodiments of the present invention.
Figure 2C:
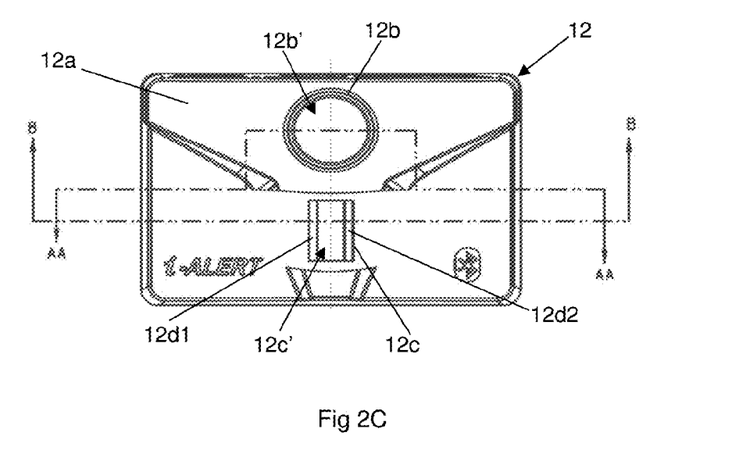
FIG. 2C is a top plan view of an outer shell of a sensing module, according to some embodiments of the present invention.
Figure 2C:
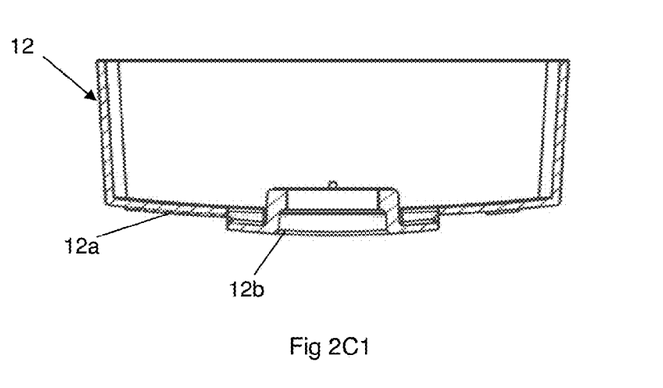
Figure 2C:
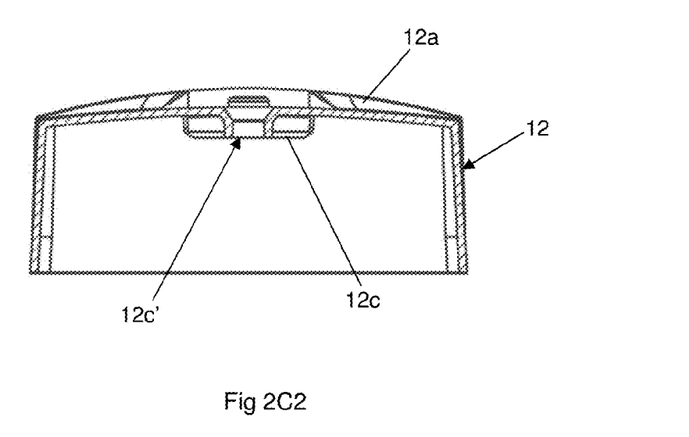
Figure 2D:
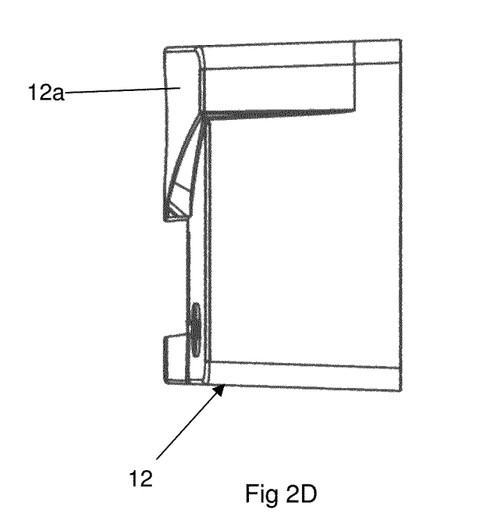
FIG. 2D is a side view of the outer shell shown in FIG. 2C, according to some embodiments of the present invention.
Figure 2E:
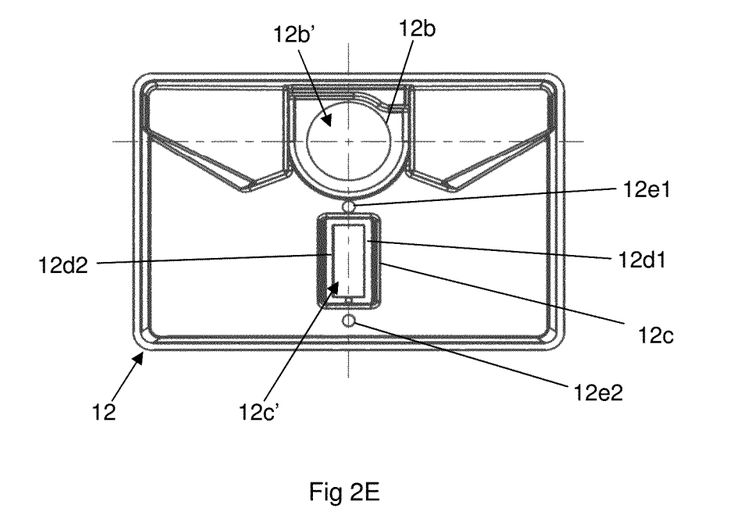
FIG. 2E is a back plan view of the outer shell shown in FIG. 2C, according to some embodiments of the present invention.

FIG. 1: The Basic Sensing Module Apparatus 10

Figure 4A:
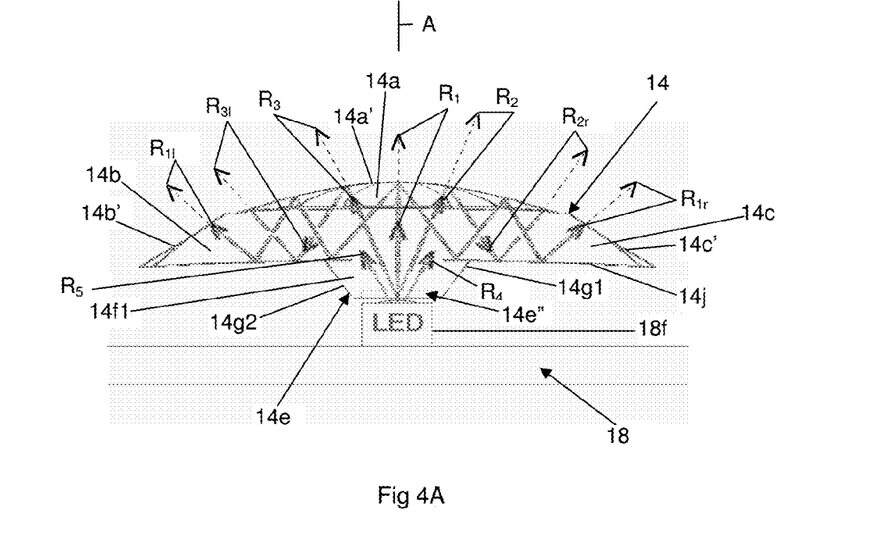
FIG. 4A is a diagram of a lens and shell window in relation to part of encapsulated electronics, according to some embodiments of the present invention.
Figure 6:
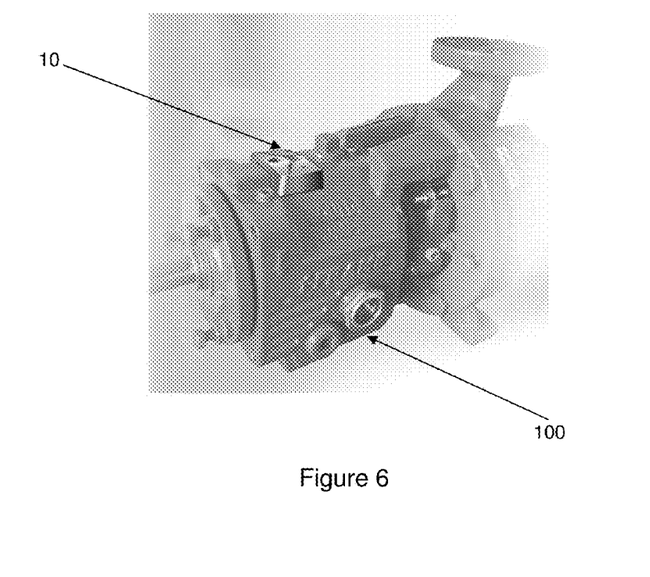
FIG. 6 is a top perspective view of a sensing module affixed to a pumping assembly, according to some embodiments of the present invention.
Figure 7:
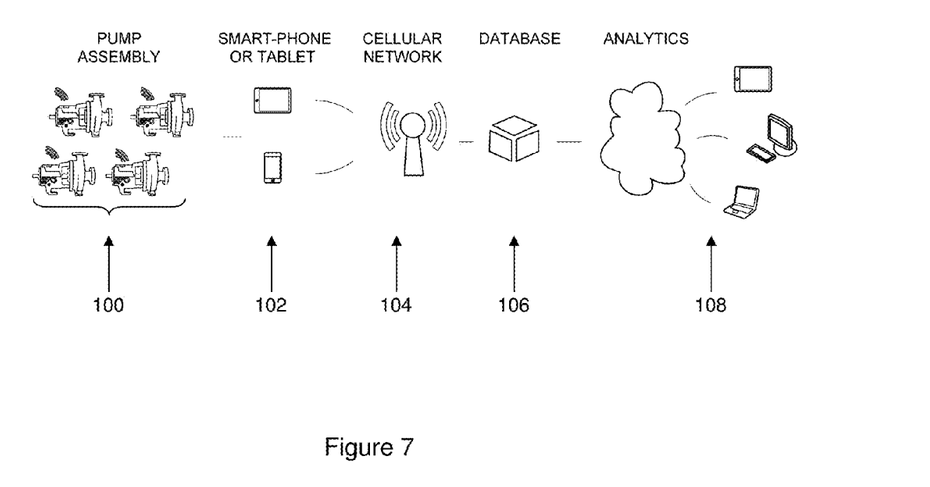
FIG. 7 is a diagram of a system having a sensing module affixed to a pumping assembly, according to some embodiments of the present invention.

By way of example, FIG. 1 shows apparatus 10 in the form of a sensing module for configuring on a vibrating machine or structure, such as pump or pump assembly 100 (e.g., see FIG. 6 or 7). The sensing module 10 may include an outer shell 12 having a top surface 12*a* with a recessed portion 12*c* in combination with a base 18, e.g., which may take the form of a printed circuit board 18*a*, having encapsulated electronics, e.g., such as elements 18*b*, 18*c*, 18*d* and 18*f* (FIG. 4). The recessed portion 12*c* is configured as, or formed with, an opening 12*c'* therein. By way of example, the opening 12*c'* is shown in FIG. 2 as a rectangular opening, although embodiments are envisioned using openings having other types or kinds of geometric shapes, such as a square.

The encapsulated electronics 18*b*, 18*c*, 18*d* and 18*f* includes a multicolored light array 18*f* (e.g., in the form of an LED array) that is arranged inside the outer shell 12, and configured to respond to signaling containing information about a condition being sensed and monitored by the sensing module 10 and provide along a projection axis A (see FIGS. 4A and 4B) at least one beam of light containing information about the condition. By way of example, the signaling may be received from one or more of the other encapsulated electronics 18*b*, 18*c*, 18*d*, e.g., which may include an accelerometer, a temperature sensing device or other suitable sensing device that is either now known or later developed in the future.

The sensing module 10 also includes a domed lens 14 configured in the recessed portion 12*c* of the outer shell 12, that is configured to reflect, re-reflect and project the at least one beam of light outwardly in relation to the projection axis A with a visibility of 360° about the sensing module 10 for viewing from afar, e.g., by an observer visually monitoring the sensing module 10.

In effect, the visibility of the at least one beam of light being reflect, re-reflect and projected from the domed lens 14 may be defined visually either as being 360° in relation to a horizontal plane extending substantially perpendicular to the projection axis A, or as being 180° in relation to a vertical plane extending substantially parallel to the projecting axis, e.g., when viewed by an observer in an industrial plant monitoring the vibrating machine or structure from a distance. In either case, the observer in the industrial plant monitoring the vibrating machine or structure may able to see the at least one beam of light being projected from the domed lens 14 from afar, e.g., with a glow of projected light.

In FIG. 1, the sensing module 10 is shown to include a mounting screw or fastener 16, a power source 20, such as a lithium ion battery, as well as a stand-off mount 22 for configuring the sensing module 10 on the vibrating machine or structure, such as the pump or pump assembly 100 (e.g., see FIG. 6 or 7).

FIG. 2: The Outer Shell 12

FIG. 2 includes FIGS. 2A through 2E that show various further details of the outer shell 12, as follows:

For example, the outer shell 12 includes a circular rim 12*b* that is configured to form a mounting opening 12*b'* for receiving the mounting screw or fastener 16 to fasten the sensing module 10 to the vibrating machine or structure, such as the pump or pump assembly 100 (e.g., see FIG. 6 or 7).

The recessed portion 12*c* includes two angled surfaces 12*d*1, 12*d*2 that are configured to receive corresponding angled surfaces 14*g*1, 14*g*2 of the domed lens 14, as shown in FIG. 3, e.g., when the domed lens 14 is arranged on the outer shell 12. The corresponding angled surfaces 14*g*1, 14*g*2 form part of the collimator 14*e* of the domed lens 14, and the two angled surfaces 12*d*1, 12*d*2 and the corresponding angled surfaces 14*g*1, 14*g*2 are configured with corresponding angled surfaces so the collimator 14e of the domed lens 14 sits and is supported securely in the recessed portion 12c of the outer shell 12.

The outer shell 12 also includes protruding tabs 12e1, 12e2 for cooperating with openings 14d1', 14d2' configured in tab 14d1, 14d2 of the domed lens 14 (see FIG. 3). The protruding tabs 12e1, 12e2 and the openings 14d1', 14d2' cooperate to orient and arrange the domed lens 14 on the outer surface 12a of the outer surface 12.

The recessed open portion 12c may be formed to receive a lower collimator lens portion 14e of the domed lens 14 when the domed lens 14 and the outer shell 12 are coupled together, e.g., consistent with that set forth below.

FIG. 3: The Domed Lens 14

Figure 3A:
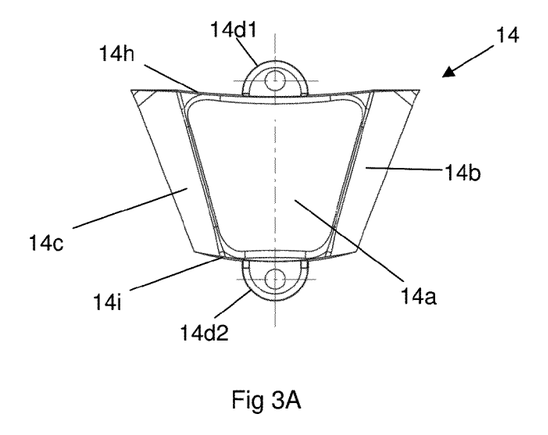
FIG. 3A is a top plan view of a lens and shell window (aka domed lens), according to some embodiments of the present invention.
Figure 3B:
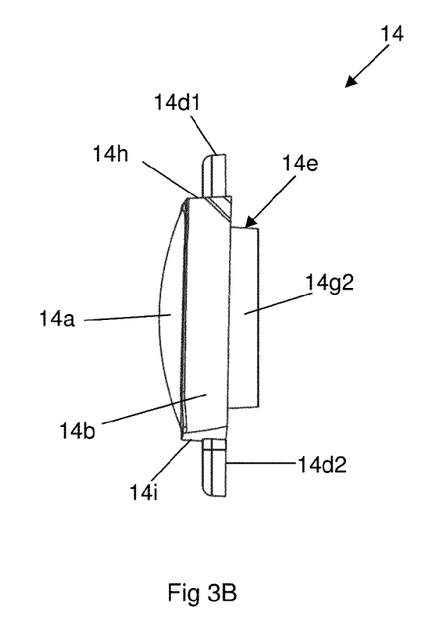
FIG. 3B is a side view of the lens and shell window shown in FIG. 3A, according to some embodiments of the present invention.
Figure 3C:
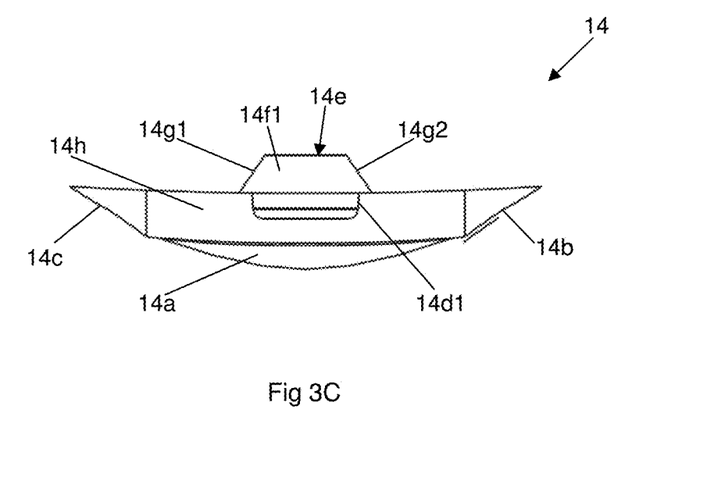
FIG. 3C is a top view of the lens and shell window shown in FIG. 3A, according to some embodiments of the present invention.
Figure 3D:
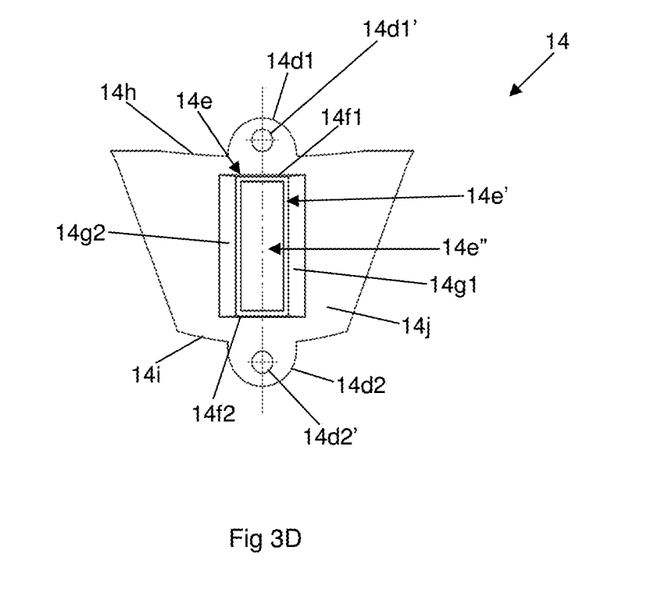
FIG. 3D is a back plan view of the lens and shell window shown in FIG. 3A, according to some embodiments of the present invention.

FIG. 3 includes FIGS. 3A through 3D that show various further details of the domed lens 14, as follows:

By way of example, FIG. 3A shows the domed lens 14 having a middle lens portion 14a configured with a top curved surface 14a' and also having two side lens portions 14b, 14c configured with side surfaces 14b', 14c'. The middle lens portion 14a and two side lens portions 14b, 14c are transparent to project the at least one beam of light from the domed lens 14. The top curved surface 14a' may be configured with a suitable curvature for projecting, reflecting and re-reflecting the at least one beam of light, e.g., consistent with that set forth below in relation to FIG. 4. The scope of the invention is not intended to be limited to any particular curvature of the top curved surface 14a', e.g. in order to achieve the desired functionality of projecting the at least one beam of light along the projection axis A with a visibility of 360° about the sensing module 10 for viewing from afar, e.g., by the observer visually monitoring the sensing module 10. Similarly, the side surfaces 14b', 14c' may be configured with a suitable angled flat or curved surface for projecting, reflecting and re-reflecting the at least one beam of light, e.g., also consistent with that set forth below in relation to FIGS. 4A and 4B. The scope of the invention is not intended to be limited to any particular angle of the flat surface or curvature of the surface 14b', 14c', e.g., in order to achieve the desired functionality of projecting the at least one beam of light along the projection axis A with a visibility of 360° about the sensing module 10 for viewing from afar, e.g., by the observer visually monitoring the sensing module 10. Moreover, the middle lens portion 14a and two side lens portions 14b, 14c may be configured together so as to cooperate and provide, e.g., the desired functionality of projecting the at least one beam of light along the projection axis A with a visibility of 360° about the sensing module 10 for viewing from afar, e.g., by the observer visually monitoring the sensing module 10. In other words, the scope of the invention is not intended to be limited to any particular curvature of the top curved surface 14a', and particular angle of the angled flat surfaces 14b', 14c', any particular curvature of the side curved surfaces 14b', 14c', or any particular physical relationship or angular configuration between the middle lens portion 14a and two side lens portions 14b, 14c, e.g., to achieve the desired functionality of projecting the at least one beam of light along the projection axis A with a visibility of 360° about the sensing module 10 for viewing from afar, e.g., by the observer visually monitoring the sensing module 10.

Figure 4B:
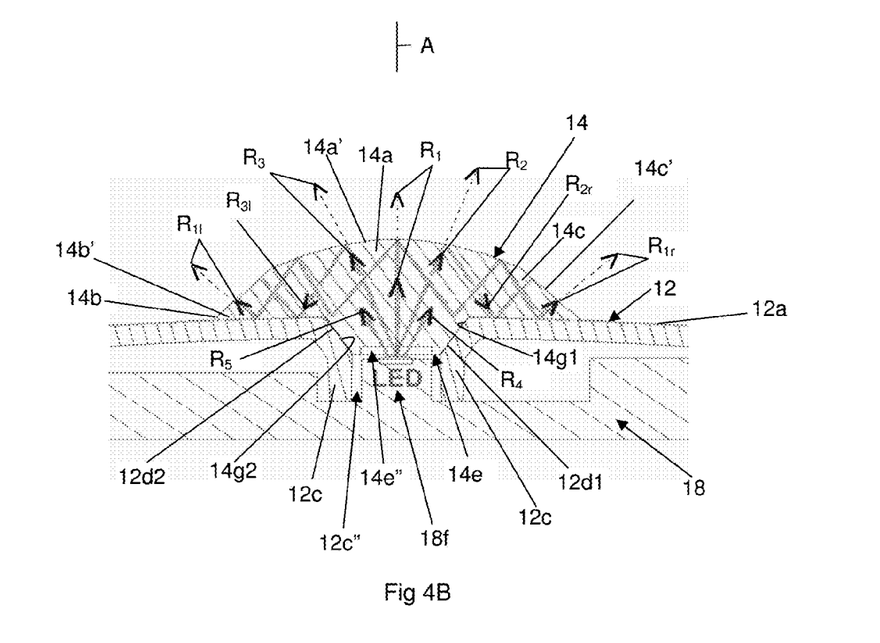
FIG. 4B is a diagram of a lens and shell window in relation to part of an outer part and part of encapsulated electronics, according to some embodiments of the present invention.

The domed lens 14 may be configured to provide a lens illumination having multiple beams of light with rays $R_1$, $R_2$, $R_3$, $R_4$, $R_5$ of light reflecting and re-reflecting off the top curved surface 14a' and the bottom surface 14j before passing through the domed lens 14 so as to provide the visibility of 360°, e.g., consistent with that shown in FIG. 4.

The domed lens 14 may be configured with a lower collimator lens portion 14e configured with a recessed cavity portion 14e'' formed by a rim 14e' to receive the at least one beam of light (see FIGS. 4A and 4B, and rays $R_1$, $R_2$, $R_3$, $R_4$, $R_5$) and provide at least one beam of collimated light to the middle lens portion 14a and the two side lens portions 14b, 14c. By way of example, the middle lens portion 14a, the two side lens portions 14b, 14c and the lower collimator lens portion 14e may be configured as a molded integral plastic unit. The molded integral unit may be made of a clear plastic, including a polyamide 12 material used for injection molding.

The lower collimator lens portion 14e may include flat upper and lower surfaces 14f1, 14f2 (FIG. 3D) and the corresponding angled surfaces 14g1, 14g2, so that the at least one beam of light projected from the multicolored light array 18f can fan outwardly into the domed lens 14 in the form of rays $R_1$, $R_2$, $R_3$, $R_4$, $R_5$ that spread out or diverge away at least partly from the projection axis A as the at least one beam of light passes through lower collimator lens portion 14e. The scope of the invention is not intended to be limited to any particular angle of the angled surfaces 14g1, 14g2.

FIG. 4: The Lens Illumination

The domed lens 14 may be configured to provide a lens illumination (or glow) having multiple beams of light with rays $R_1$, $R_2$, $R_3$, $R_4$, $R_5$ of light reflecting and re-reflecting off the top curved surface and the bottom surface before passing through the domed lens so as to provide the visibility of 360°. As a person skilled in the art would appreciate, the reflection and re-reflection of the multiple beams of light with rays $R_1$, $R_2$, $R_3$, $R_4$, $R_5$ of the domed lens are based at least partly upon the principles associated with Snell's law, which is known in the art. In addition, as a person skilled in the art would also appreciate, some light rays may project or pass through the top curved surface 14a', e.g., without reflecting, while other light rays $R_{1r}$, $R_{1l}$, $R_{2r}$, $R_{3l}$, may be refracted and reflected off the top curved surface 14a' and the bottom surface 14j, and then either may project or pass through the top curved surface 14a' or the side surfaces 14b', 14c', or be re-reflected off the top curved surface 14a' or the side surfaces 14b', 14c', etc., consistent with that shown in FIG. 4. (FIGS. 4A and 4B are provided by way of example showing some rays being projected, reflected, and/or re-reflected and are not intended to be drawn to scale. Moreover, for the sake of reducing clutter, FIGS. 4A and 4B include some rays projected by the LED and include labeling for some but not all rays shown therein.)

The Multicolored Light Array

The multicolored light array 18f (FIG. 4) may include, or take the form of, a multicolored LED array. The multicolored LED 18f may include, for example:
- a green LED, e.g., that indicates that the device being monitored is in good condition;
- a red LED, e.g., that indicates that the device being monitored is in an alarm condition; and
- a blue LED, e.g., that indicates that the sensing module is paired with another device.

LEDs and LED arrays are known in the art, and the scope of the invention is not intended to be limited to any particular type or kind thereof either now known or later developed in the future. Embodiments are also envisioned where multiple LEDs project light at the same time, e.g., to project light having colors of the combined light being projected.

The Encapsulated Electronics

As discussed above, the encapsulated electronics that form part of the base 18 may include sensors configured to respond to the condition being sensed and monitored by the sensing module 10 and provide the signaling to be received by the multicolored light array. The encapsulated electronics may also include, or form part of, other types or kinds of electronics like processing electronics, power electronics, and/or radio transmission/receiving electronics, etc.

Moreover, the sensing module may include a sensing LED and an activation sticker configured to engage a top surface of the outer shell and cover the sensing LED; the sensing LED may be configured to respond to presence or absence of ambient light and provide a sensing LED signal containing information to turn the sensing module ON or OFF depending on the ambient light sensed; and the activation sticker may be configured to be peeled off the top surface of the outer shell so as to allow the sensing LED to sense the presence of light.

The sensing module may include a light sensing LED module configured to receive suitable signaling to change the light level sensitivity of the light sensing LED.

The suitable signaling may be provided by a mobile application or app.

By way of example, as a person skilled in the art would appreciate techniques for encapsulating electronics and/or sensor modules, including sensors that may be configured to respond to temperature and vibration stimuli and provide the signaling containing information about temperature and vibration data sensed, e.g., including where the sensors are accelerometers or temperature sensors, are known in the art, and the scope of the invention is not intended to be limited to any particular type or kind thereof either now known or later developed in the future.

FIG. 7

This application is related to patent application Ser. No. 14/681,577, filed 8 Apr. 2015, entitled "Nodal dynamic data acquisition and dissemination," which is hereby incorporated by reference in its entirety. By way of example, the aforementioned patent application Ser. No. 14/681,577 discloses a system 200 having the pumping system 100, the smart-phone or tablet 102, a cellular network 104, a database 106 and analytics 108, consistent with that shown in FIG. 7.

By way of example, the sensor module 10 disclosed herein may be configured or integrated with a Bluetooth Low Energy radio, which enables real time data capture, storage, transmission and analysis by a mobile device. As shown in FIG. 7, the sensor module 10 may be configured to wirelessly transmit data to connectivity-enabled devices that use a cellular data link in the cellular network 104 to communicate with a backend server that forms part of the analytics 108. The database 106 may be configured to store collected data and a software application that allows the data to be analyzed, reported, and acted upon are also key components of a successful end-to-end solution.

Moreover, by combining low-cost, low-power sensor technology with the Smart-Phones or Tablets 102, the customer can now interact with the pump 100 to understand the current operating state, when and where a problem is occurring and the severity of the fault condition. With this information, the customer can shift from being reactive to proactive driving down costs while increasing productivity.

The sensing module 10 is provided by way of example as one type of sensing module that may be used in the system 200 shown in FIG. 7.

Key and Differentiating Features

The following is a summary of some important hardware features of the sensor module 10 disclosed herein and the associated system 200 disclosed herein:

The outer shell 12 may be configured using an industrial designed outer shell, e.g., that adds a distinctive and integrated look to the sensing module when mounted to the pump or pump assembly 100. In addition, the outer shell 12 may be procured with a special material to protect the internal electronics from the rigors of harsh and hazardous environment of an industrial plant.

In operation, the domed lens 14 may be configured to concentrate the LED light into the outer domed shaped lens providing for optimal visibility, e.g., by providing 360° of viewing of the LED indicators.

The base 18 having the encapsulated electronics is designed for intrinsic safety which allows the sensing module or device 10 to be operated in hazardous environments. One or the encapsulated electronics 18b, 18c, 18d may include, or contain, the sensing modules and/or a microprocessing power module to collect and analyze both temperature and vibration data. In addition, one of the encapsulated electronics 18b, 18c, 18d may include, or take the form of, a Bluetooth real-time condition monitoring Low Energy Radio module that may be utilized to communicate information to a mobile smart device that the operator can easily view and react to. The electronics and embedded software (S/W) may be designed to optimize power consumption allowing for long device life.

The power source 20 may take the form of a high efficiency Lithium Ion battery which optimizes the power to size ratio to allow for a compact device with long battery life, although the scope of the invention is not intended to be limited to any particular type or kind of power source.

The universal mount design includes one or more standoffs 22, which allows the sensing module to be mounted onto virtually any surface, e.g., using a fastener or epoxy.

Figure 5A:
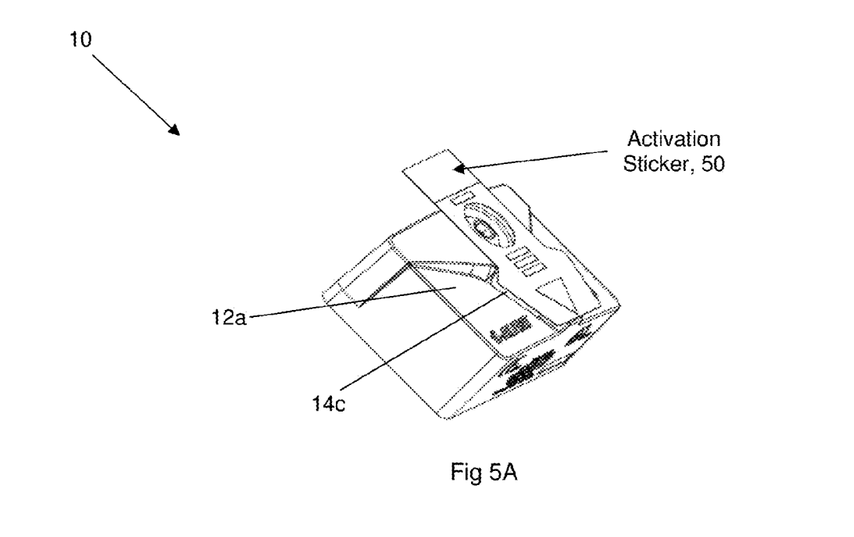
FIG. 5A shows a top perspective view of a sensing module having an activation sticker affixed thereto, according to some embodiments of the present invention, and where
Figure 5B:
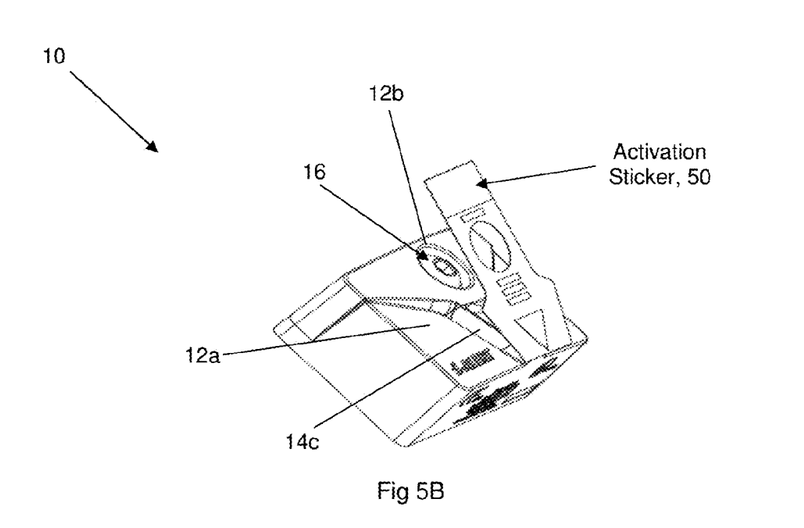
FIG. 5B shows a top perspective view of a sensing module having an activation sticker affixed thereto and partially removed, according to some embodiments of the present invention.

The LED sensing light activation sticker 50 allows the sensing module 10 to be turned 'On' via exposure to ambient light. The 'Activation' sticker 50 may be located or affixed on the sensing module 10, and once removed a sensing LED that forms part of the sensing array 18f may be configured to sense the light and turns the sensing module 'ON' for fail safe activation. Moreover, the activation light level can be changed via an mobile application or app, e.g., so that the activation light level can be optimized for the environment that it is located in (i.e. dark cave or bright sunlight, etc.).

The sensing module 10 may be configured with a magnetic activation arrangement which allows the sensing module to be manually turned 'ON/OFF', e.g., by holding a magnet over, e.g., the power symbol 12m (see FIGS. 2A and 2B) on the top surface 12a on the sensing module.

The following is a summary of some important software features of the sensor module 10 disclosed herein and the associated system 200:

Remote wireless connection(s) to smart devices: The ability to connect to a remote wireless 'smart device' 102 (iPhone, iPad, Android Device, etc.). An operator doesn't have to be in view of the sensing module 10 in order to monitor the status of the equipment. Alarm status, vibration data, temperature data can be sent to a remote 'smart device' via a wireless connection using the cellular network 104.

Handling Detection: The ability to detect the physical movement of the sensing module 10 to a different pump or different location.

Base-lining: The ability to set the monitored equipment's baseline vibration and temperature alarm threshold limits. After installation and start-up, statistical data may be collected over a pre-defined period of time. Once the data has been collected, the statistical upper limit of the data may be determined. This upper limit may be used to set off an alarm if vibration amplitudes exceed this upper limit.

Pump type Connection to the sensing module 10: The pump identifying information (Model #, Part #, etc.) may be linked to the attached sensing module 10 and thru a mobile smart device 102 can be used to access pertinent pump information such as part list, service, maintenance, etc.

Example: A pump is in an alarm state, and it is determined that it is a bearing issue. Using a smart device like 102 with the sensing module app, one can access the pump database and identify the bearing part # and ordering information for quick and easy ordering.

Fast Fourier Transform (FFT) and Trend Data Transfer to Smart Devices: Both FFT and Trend data for both temperature and vibration may be sent to the mobile smart devices per operator request. The FFT and Trend data graphs can be viewed on the smart device for quick analysis.

Possible Applications

Possible applications include at least the following: Nodal and web configurations, e.g., like that shown in FIG. 7.

The Scope of the Invention

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the invention has been described and illustrated with respect to exemplary embodiments thereof, the foregoing and various other additions and omissions may be made therein and thereto without departing from the spirit and scope of the present invention.

We claim:

1. A sensing module for configuring on a vibrating machine or structure, including a pump, comprising:
    an outer shell configured with a recessed portion;
    a base having encapsulated electronics with a multicolored light array that is arranged inside the outer shell, the multicolored light array being configured to respond to signaling containing information about a condition being sensed or monitored by the sensing module and to provide along a projection axis at least one beam of light containing information about the condition; and
    a domed lens configured in the recessed portion of the outer shell, and also configured with a top curved surface, a bottom surface and two side lens portions with side surfaces to reflect, re-reflect and project the at least one beam as a lens illumination or glow having multiple beams of light rays outwardly from the domed lens in relation to the projection axis with a visibility of 360° about the sensing module.

2. A sensing module according to claim 1, wherein each side surface comprises a side angled flat or curved surface that is transparent to project at least part of the at least one beam of light as the lens illumination or glow.

3. A sensing module according to claim 1, wherein the domed lens comprises a middle lens portion having the top curved surface and the two side lens portions, and also comprises a lower collimator lens portion configured to receive the at least one beam of light and provide at least one beam of collimated light to the middle lens portion.

4. A sensing module according to claim 3, wherein the middle lens portion, the two side lens portions and the lower collimator lens portion are configured as a molded integral unit.

5. A sensing module according to claim 4, wherein the molded integral unit is made of a clear plastic, including a polyamide 12 material used for injection molding.

6. A sensing module according to claim 1, wherein the domed lens is configured with a lower collimator lens portion configured to receive the at least one beam of light and provide at least one beam of collimated light.

7. A sensing module according to claim 1, wherein the recessed portion is configured as a recessed open portion formed to receive the lower collimator lens portion when the domed lens and the outer shell are coupled together.

8. A sensing module according to claim 1, wherein the multicolored light array comprises a multicolored LED array.

9. A sensing module according to claim 8, wherein the multicolored LED array comprises:
    a green LED that indicates that the device being monitored is in good condition;
    a red LED that indicates that the device being monitored is in an alarm condition; and
    a blue LED that indicates that the sensing module is paired with another device.

10. A sensing module according to claim 1, wherein the encapsulated electronics comprises sensors configured to respond to the condition being sensed and monitored by the sensing module and provide the signaling to be received by the multicolored light array.

11. A sensing module according to claim 10, wherein the sensors are configured to respond temperature and vibration stimuli and provide the signaling containing information about temperature and vibration data sensed.

12. A sensing module for configuring on a vibrating machine or structure, including a pump, comprising:
    an outer shell configured with a recessed portion:
    a base having encapsulated electronics with a multicolored light array that is arranged inside the outer shell, the multicolored light array being configured to respond to signaling containing information about a condition being sensed or monitored by the sensing module and to provide along a projection axis at least one beam of light containing information about the condition; and
    a domed lens configured in the recessed portion of the outer shell, and also configured with a top curved surface to reflect, re-reflect and project the at least one beam of light outwardly in relation to the projection axis with a visibility of 360° about the sensing module:
    wherein the sensing module comprises a sensing LED and an activation sticker configured to engage a top surface of the outer shell and cover the sensing LED;

the sensing LED configured to respond to presence or absence of ambient light and provide a sensing LED signal containing information to turn the sensing module ON or OFF depending on the ambient light sensed; and the activation sticker configured to be peeled off the top surface of the outer shell so as to allow the sensing LED to sense the presence of the ambient light.

13. A sensing module according to claim 12, wherein the sensing module comprises a light sensing LED module configured to receive suitable signaling to change the light level sensitivity of the light sensing LED.

14. A sensing module according to claim 13, wherein the suitable signaling is provided by a mobile application or app.

15. A sensing module according to claim 12, wherein the base is configured as a printed circuit board having the encapsulated electronics formed thereon.

16. A sensing module according to claim 3, wherein the lower collimator lens portion includes outwardly angled surfaces, so that the at least one beam of light projected from the multicolored light array can fan outwardly into the domed lens in the form of rays that spread out or diverge away at least partly from the projection axis as the at least one beam of light passes through lower collimator lens portion.

* * * * *